(12) United States Patent
Agarwal

(10) Patent No.: US 11,580,349 B1
(45) Date of Patent: Feb. 14, 2023

(54) STACKABLE INTEGRATED CIRCUIT CARDS

(71) Applicant: Visa International Service Association, San Francisco, CA (US)

(72) Inventor: Ved Prakash Sajjan Kumar Agarwal, Dubai Marina (AE)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 0 days.

(21) Appl. No.: 17/463,226

(22) Filed: Aug. 31, 2021

(51) Int. Cl.
G06K 19/077 (2006.01)
G06K 19/07 (2006.01)

(52) U.S. Cl.
CPC ... G06K 19/07796 (2013.01); G06K 19/0719 (2013.01); G06K 19/0723 (2013.01); G06K 19/07769 (2013.01); G06K 19/07777 (2013.01)

(58) Field of Classification Search
CPC ....... G06K 19/07777; G06K 19/07769; G06K 19/0723; G06K 19/0719; G06K 19/07796
See application file for complete search history.

(56) References Cited

U.S. PATENT DOCUMENTS

| | | | | |
|---|---|---|---|---|
| 5,543,607 A * | 8/1996 | Watanabe | | G07G 1/0045 235/383 |
| 7,137,552 B1 * | 11/2006 | Lasch | | G06K 19/06196 235/487 |
| 8,498,900 B1 * | 7/2013 | Spirin | | G06Q 20/14 705/30 |
| 8,967,471 B1 * | 3/2015 | Rosenthal | | G06K 7/0095 235/379 |
| 10,628,724 B1 * | 4/2020 | Adcock | | G06Q 20/341 |
| 10,679,207 B1 | 6/2020 | Huffines | | |
| 11,250,406 B2 * | 2/2022 | Ericson | | G06Q 20/405 |
| 2003/0195840 A1 * | 10/2003 | Xu | | G06Q 40/02 705/38 |
| 2007/0145152 A1 * | 6/2007 | Jogand-Coulomb | | G06K 7/10237 235/441 |
| 2007/0218728 A1 * | 9/2007 | Jow | | G06K 19/07741 439/159 |
| 2009/0184167 A1 * | 7/2009 | Faith | | G07F 7/0806 235/492 |
| 2011/0042464 A1 * | 2/2011 | Itay | | G06Q 20/352 235/492 |

(Continued)

FOREIGN PATENT DOCUMENTS

WO 2017003720 A1 1/2017

*Primary Examiner* — Daniel I Walsh
(74) *Attorney, Agent, or Firm* — Kilpatrick Townsend & Stockton LLP

(57) ABSTRACT

Systems and methods allow for the integrated circuit cards (ICCs) to removably couple to each other and transmit information to an access device as a single device. One among the two or more ICCs coupled together may read data from the remaining ICCs and provide the data to an access device via contactless communication. The ICC may include a substrate; an integrated circuit embedded in the substrate; input ports exposed on a first surface of the substrate, and output ports exposed on a second surface of the substrate. The input ports and the output ports are electrically coupled to the integrated circuit. The output ports are configured to be removably coupled to the input ports of a second ICC.

16 Claims, 11 Drawing Sheets

(56) References Cited

U.S. PATENT DOCUMENTS

| | | |
|---|---|---|
| 2013/0041824 A1 | 2/2013 | Gupta |
| 2014/0025513 A1* | 1/2014 | Cooke .................... G06Q 20/10 705/17 |
| 2015/0170016 A1* | 6/2015 | Avagliano ............. G07F 7/0833 705/41 |
| 2017/0364914 A1 | 12/2017 | Howard |
| 2018/0189761 A1* | 7/2018 | Locke ................ G06Q 20/3223 |
| 2020/0210984 A1* | 7/2020 | Ericson ................ G06Q 20/353 |
| 2021/0209580 A1* | 7/2021 | Agarwal .............. G06Q 20/341 |
| 2021/0406633 A1* | 12/2021 | Lee ........................ H02J 50/20 |

* cited by examiner

STACKABLE INTEGRATED CIRCUIT CARDS

CROSS-REFERENCES TO RELATED APPLICATIONS

None

BACKGROUND

Conventionally, a payment amount can be split among multiple payment cards by calculating the amount to be charged to each payment card, and processing the partial payment using each payment card. The process requires manual calculations and processing each payment card individually. Alternatively, payment applications may be used for one person to collect partial payments from other individuals, and processing the full amount for the transaction using a single card. In some cases, the person collecting the partial payments may use a payment application (e.g. a payment app) and may request the other individuals to transfer funds using the application. This option requires all individuals to use the same application, and to have a payment account linked to the application, which may not be a desirable option for some.

Embodiments address these and other problems, individually and collectively.

BRIEF SUMMARY

Embodiments include integrated circuit cards (e.g. payment cards) and methods that allow for the integrated circuit cards to couple to each other and transmit information to an access device as a single device.

Various embodiments provide a method performed by a first integrated circuit card. The method includes establishing a wireless communication channel with an access device, and transmitting a current to a second integrated circuit card physically coupled to the first integrated circuit card such that an output port of the first integrated circuit card is coupled to an input port of the second integrated circuit card. The method further includes retrieving data from the second integrated circuit card, and incorporating the data received from the second integrated circuit card with data stored on the first integrated circuit card into a combined data record. The method further includes transmitting the combined data record to the access device via the wireless communication channel.

Embodiments also provide an integrated circuit card comprising a substrate; an integrated circuit embedded in the substrate; a plurality of input ports exposed on a first surface of the substrate, and a plurality of output ports exposed on a second surface of the substrate opposite from the first surface. The plurality of input ports and the plurality of output ports are electrically coupled to the integrated circuit. One or more of the plurality of output ports are configured to be removably coupled to one or more input ports of a second integrated circuit card.

Some embodiments provide a system comprising a first integrated circuit card and a second integrated circuit card. The first integrated circuit card includes a first integrated circuit, a first antenna, a first set of input ports and a first set of output ports. The second integrated circuit card includes a second antenna, a second set of input ports and a second set of output ports. The second integrated circuit card is removably coupled to the first second integrated circuit card when the first set of output ports are physically and electrically coupled to the second set of input ports.

These and other embodiments are described in further detail below.

DETAILED DESCRIPTION

Figure 1A:
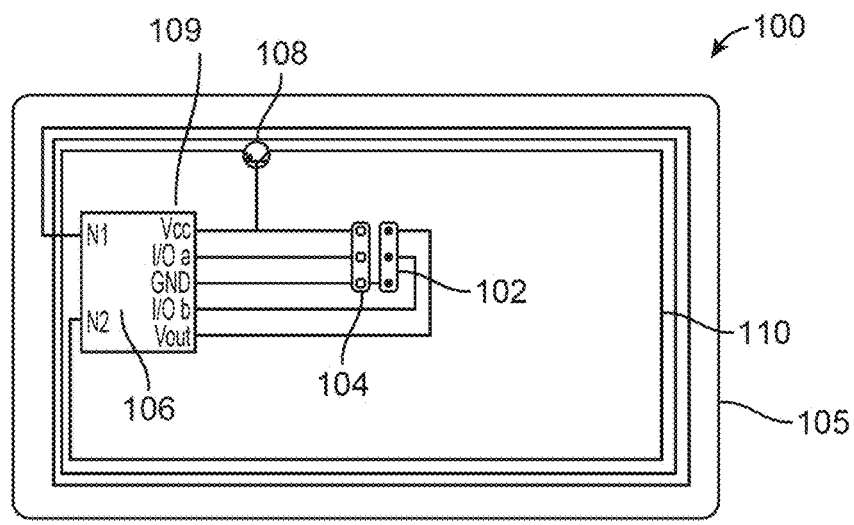
FIG. 1A illustrates an internal structure of an exemplary integrated circuit card (ICC) according to various embodiments.

Prior to discussing specific embodiments, some terms may be described in detail.

A "integrated circuit card" can include a circuit (e.g. a chip) embedded in a card, such as a payment card, an access card or a transit card. The card may also include an antenna that is coupled to the circuit. The circuit can include a cryptographically secure computer-on-a-chip or microprocessor. The circuit may include a memory that securely stores data, such that its access is protected. The circuit can include a trusted execution environment on a secure area of a processor.

An "amount" can include a quantity of something. An amount can include a total of a thing or things in number, size, value, or extent.

A "contactless" communication may be a communication in which data is exchanged between two devices without the need for the devices to be physically coupled. Without limiting the generality of the foregoing, "contactless" communication can include data transmissions by near-field communication (NFC) transceiver, laser, radio frequency, infrared communications, or other radio frequency or wireless communication protocols such as Bluetooth, Bluetooth low-energy (BLE), Wi-Fi, iBeacon, etc. A "contactless" communication may also be referred herein as a "wireless" communication.

An "access device" may be any suitable device for providing access to something. An access device may be in any suitable form. Some examples of access devices include point of sale (POS) devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, transit or event gates, access systems, websites, and the like. An access device may use any suitable contact or contactless mode of operation to send or receive data from, or associated with, a user device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a user device.

A "user" may include an individual. In some embodiments, a user may be associated with one or more personal accounts and/or integrated circuit cards. The user may also be referred to as a cardholder, account holder, or consumer.

A "resource provider" may be an entity that can provide a resource such as goods, services, information, and/or access. Examples of resource providers include merchants, access devices, secure data access points, etc. A "merchant" may typically be an entity that engages in transactions and can sell goods or services, or provide access to goods or services.

An "authorization request message" may be an electronic message that requests authorization for an interaction. In some embodiments, it is sent to a processing network computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction. An "authorization request message" may also be used to request authorization to access a location, access secure data, etc.

An "authorization response message" may be a message that responds to an authorization request. In some cases, it may be an electronic message reply to an authorization request message generated by an issuing financial institution or a processing network computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the processing network computer) to the merchant's access device (e.g., POS equipment) that indicates approval of the transaction. The code may serve as proof of authorization.

An "authorizing entity" may be an entity that authorizes a request. Examples of an authorizing entity may be an issuer, a transit agency, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Embodiments can relate to removably coupling two or more integrated circuit cards (ICCs) together and using one among the two or more ICCs to read data from the remaining ICCs and to provide the data (e.g. by transmitting or by providing a read-access) to an access device via, for example, contactless communication. In some embodiments, the access device may provide physical access to a building. For example, access may be granted to a group of people whose identification cards (e.g. ID cards with integrated circuits) have been coupled together and presented to the access device. In other embodiments, the access device may include a transaction terminal (e.g. POS). For example, a total transaction amount may be split among a set of accounts identified by ICCs coupled together and presented to the access device. These and other features of the embodiments are explained below in greater detail.

Figure 1B:
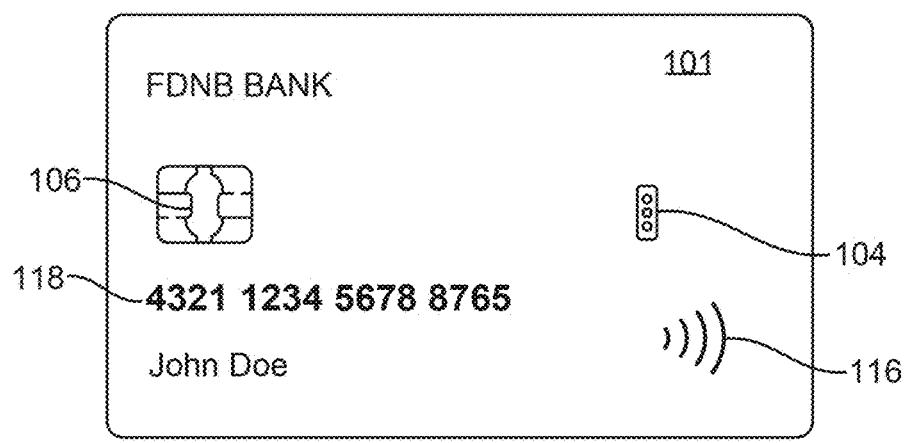
FIG. 1B illustrates a first surface of the ICC illustrated in FIG. 1A according to various embodiments.
Figure 1C:
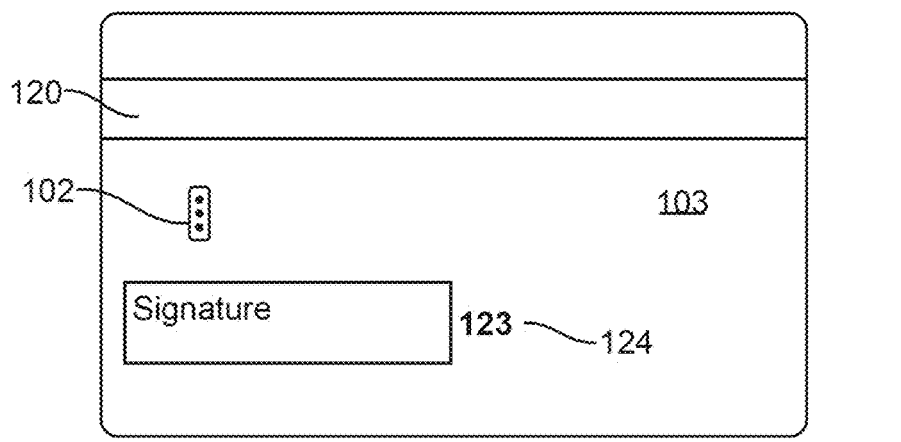
FIG. 1C illustrates a second surface (opposite from the first surface) of the ICC illustrated in FIG. 1B according to various embodiments.

FIGS. 1A-1C illustrate an exemplary integrated circuit card (ICC) 100. FIG. 1A illustrates an internal structure of the ICC 100. FIG. 1B illustrates a first surface of the ICC 100. FIG. 1C illustrates a second surface (opposite from the first surface) of the ICC 100.

Figure 7:
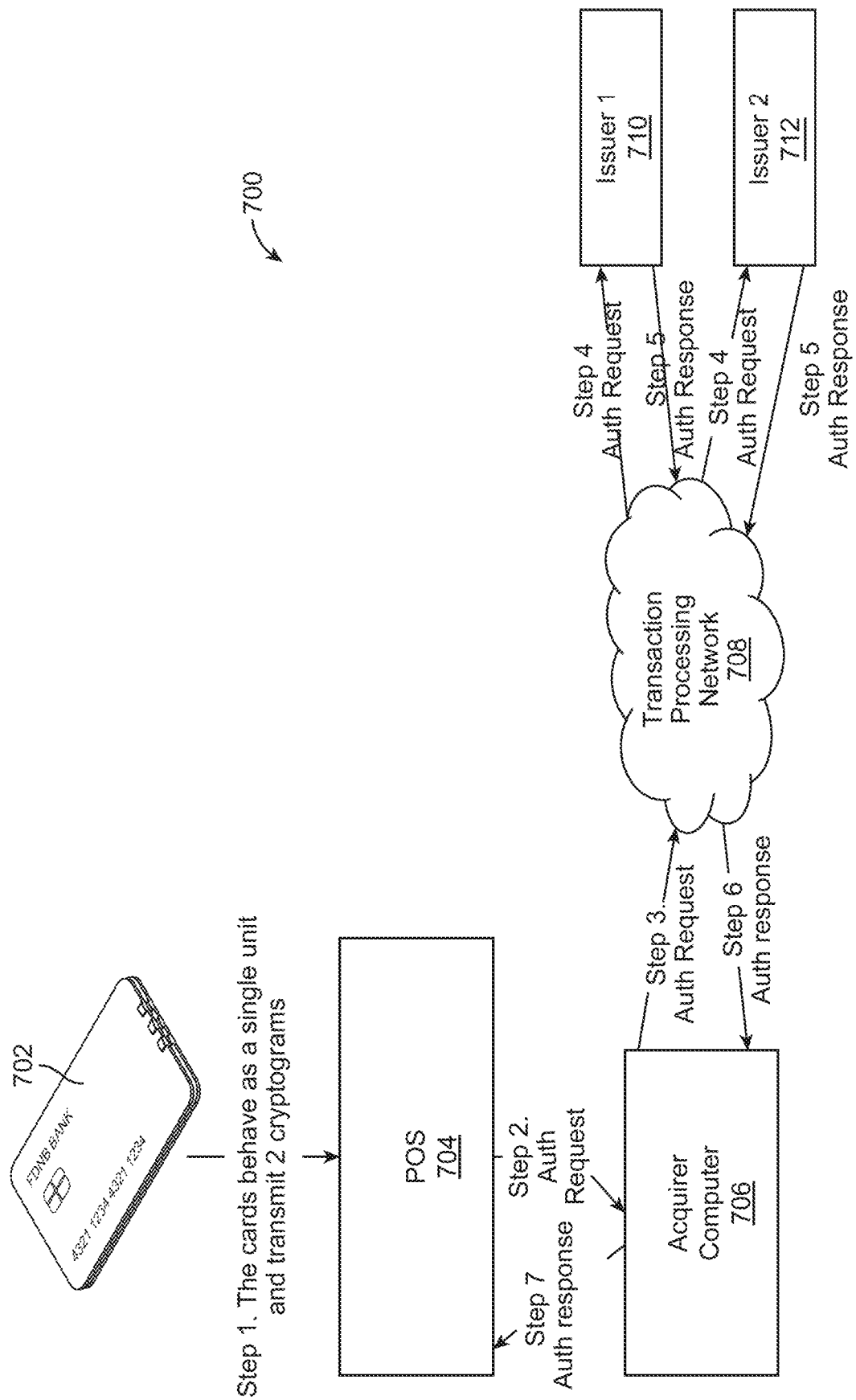
FIG. 7 illustrates another block diagram and flowchart of steps that are performed in connection with splitting a transaction using multiple stacked integrated circuit cards, according to various embodiments.

The ICC 100 includes a substrate 105. An electronic circuit 106 may be embedded in the substrate 105. The electronic circuit 106 may be coupled to an antenna 110 (e.g. a near field communication (NFC) antenna, or an inductive antenna as shown in FIG. 7). The electronic circuit 106 may include a plurality of pins 109 (e.g. a power supply pin Vcc, a first input/output pin I/O$_a$, a ground pin GND, a second input/output pin I/O$_b$, Vout, input pins N1 and N2). A set of input ports 104 may be formed on a first surface 101 of the substrate 105 and electrically coupled to a subset of the plurality of pins 109 of the electronic circuit 106. A set of output ports 102 may be formed on a second surface 103 of the substrate opposite from the first surface 101 and electrically coupled to a subset of the plurality of pins 109 of the electronic circuit 106. The input ports 104 and the output ports 102 are exposed on respective surfaces of the ICC 100.

According to some embodiments, the ground pin GND is connected to one of the input ports 104 and one of the output ports 102. That is, one of the plurality of input ports 104 and one of the plurality of output ports 102 are connected to a same pin (e.g. the ground pin) of the integrated circuit. Vcc and I/O$_a$ pins of the electronic circuit 106 are connected to two of the input ports 104. Vout and I/O$_b$ pins of the electronic circuit 106 are connected to two of the output ports 102. The input pins N1 & N2 may be connected to the NFC antenna (e.g. an inductive antenna). The NFC antenna is activated when the ICC 100 comes in an operating range of an access device. The access device antenna induces current in the NFC antenna of the ICC 100 and in turn provides operating power to the electronic circuit 106. Accordingly, the ICC 100 does not require an integrated power source (e.g. a battery) to perform the functions described herein.

As shown in FIG. 1B, the input ports 104 and the electronic circuit 106 may be exposed on the first surface 101 of the substrate 105. The first surface 101 may also include further information (e.g. user and/or account identifying information such as the user name, an account number) printed on the substrate 105. According to various embodiments, the ICC 100 may be a contactless card that is capable of establishing contactless communication with an access device and transmitting information to the access device using contactless technologies such as near-field communication (NFC) technology using the inductive antenna 110. The contactless function may be indicated on the ICC 100 using a contactless icon 116.

As shown in FIG. 1C, the second surface 103 may include a magnetic stripe 120 and additional information 124 (e.g. the signature of the user, a verification number (e.g. a CVV number), a telephone number of an issuer of the card, etc.). The output ports 102 may be exposed on the second surface 103. In some embodiments, the input ports 104 are placed symmetric to the output ports 102 with respect to the substrate 105. This way, when a first ICC is removably coupled to a second ICC, the output ports of the first ICC are aligned with the input ports of the second ICC. According to various embodiments, the one or more of the output ports 102 of the ICC 100 are configured to be removably coupled to one or more input ports of another integrated circuit card, as explained below in greater detail. The ICC 100 retrieves or reads data from another ICC when the output ports of the ICC 100 are electrically and physically coupled to the input ports of the other ICC.

According to various embodiments, the ICC 100 further includes a transistor 108 connected in series between an input pin (e.g. N1) of the ICC 100 and the inductive antenna 110, wherein when current is applied to a base junction of the transistor 108 (e.g. via one of the input ports 104), the circuit between the antenna 110 and the electronic circuit 106 is disconnected, which disables the contactless communication capability of the ICC 100.

Figure 2:
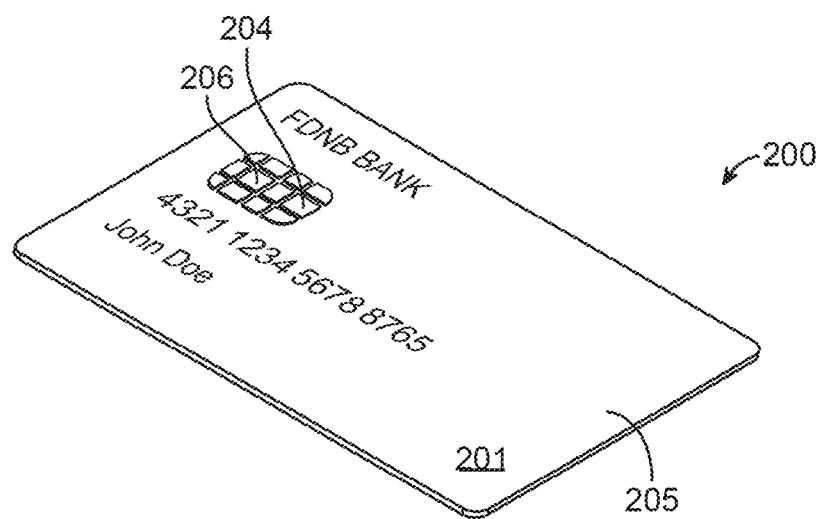
FIG. 2 illustrates an exemplary integrated circuit card with exposed input ports according to various embodiments.

FIG. 2 illustrates an exemplary integrated circuit card with exposed input ports. The ICC 200 includes a substrate 205. An electronic circuit 206 is embedded in the substrate 205. The ICC 200 further includes a plurality of input ports 204 exposed on the first surface 201. As shown in FIG. 2, the plurality of input ports 204 are combined with the electronic circuit 206 on the first surface 201 of the substrate 205. The placement of the input ports 204 (e.g. combined with the electronic circuit 206 as shown in FIG. 2, or separated from the integrated circuit 106 as shown in FIG. 1B) does not alter the functioning of the ICC 200 as long as the input ports 204 are coupled to the electronic circuit 206 and the output ports as explained in connection with FIGS. 1A-1C.

As provided above, the ICC 100 may be configured to be removably coupled to another ICC. To facilitate the alignment and the connection between two or more ICCs, alignment widgets may be provided on each ICC. For example, the ICCs may be provided with magnetic connectors.

Figure 3A:
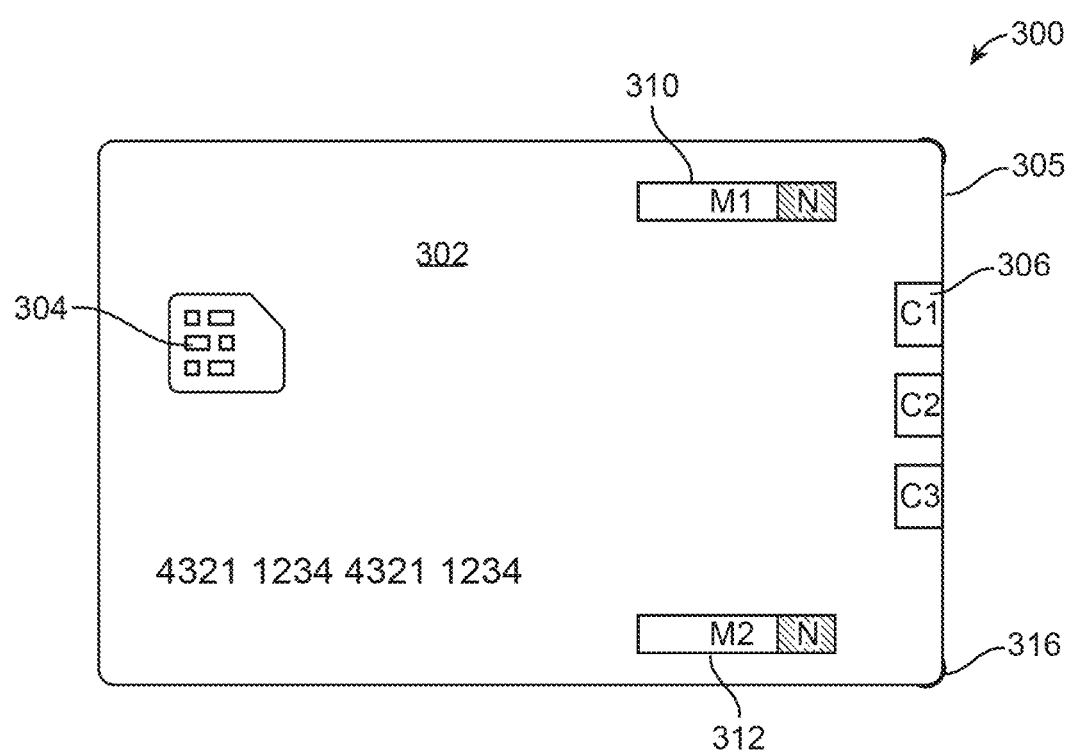
FIGS. 3A-3B illustrate a first and second surface of an exemplary ICC with magnetic connectors, respectively, according to various embodiments.
Figure 3B:
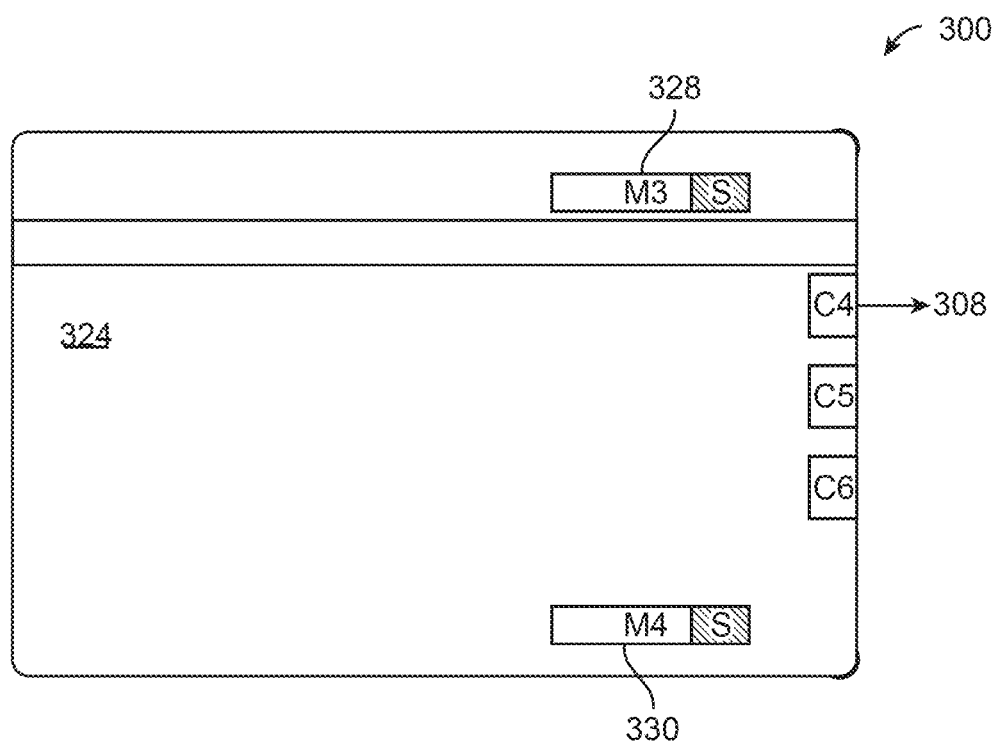

FIGS. 3A-3B illustrate a first and second surface of an ICC with magnetic connectors respectively. As shown in FIG. 3A, the ICC 300 includes a chip 304 (e.g. an electronic circuit) and a plurality of input ports 306 that are exposed on a first surface 302 of the substrate 305. The ICC 300 further includes a first magnetic connector 310 having a first polarity provided on the first surface 302 of the substrate 305. In some embodiments, an additional magnetic connector 312 having the same first polarity may also be provided on the first surface 302.

FIG. 3B illustrates a second surface of the ICC 300. As shown in FIG. 3B, the ICC 300 includes a set of output pins 308 on the second surface 324 of the substrate that is opposite from the first surface 302. The ICC 300 further includes a second magnetic connector 328 having a second polarity provided on the second surface 324 of the substrate 305. In some embodiments, an additional magnetic connector 320 having the same second polarity may also be provided on the second surface 324. For example, the magnetic connectors on the first surface 302 of the ICC 300 may have the "north" polarity, while the magnetic connectors on the second surface 324 of the ICC may have the "south" polarity. When the ICC 300 is coupled with another ICC, the magnetic connectors on a bottom surface of the ICC 300 having, for example, the south polarity, would contact the magnetic connectors on a top surface of the other ICC having, for example, the north polarity. The attraction between the opposite poles of the magnetic connectors of the ICCs will allow for the output ports of the ICC 300 to be aligned with and in correct position with respect to the input ports of the other ICC. Thus, the magnetic connectors improve the alignment, the positioning and the connection between two ICCs when coupled together.

In some embodiments, the ICC 300 further includes additional surface features such as raised edges 316 along one or more corners of the ICC 300. The raised edges 316 further improve the alignment and positioning of the ICC 300 with respect to another ICC.

As provided above, an integrated circuit card (ICC) as described herein may be removably coupled to one or more additional integrated circuit cards. Once coupled, the first ICC may read data (e.g. account information) from the additional integrated circuit cards. The first ICC may combine the data from the additional ICCs with data stored on the first ICC into aggregated data. The first ICC may then transmit the aggregated data to an access device via contactless communication. For example, in order to pay for a total amount of a transaction, the first ICC may gather the account information (e.g. an account number, an expiration date, a verification number (e.g. CVV)) from additional ICCs, and provide the aggregated account data to an access device processing the transaction.

Figure 4:
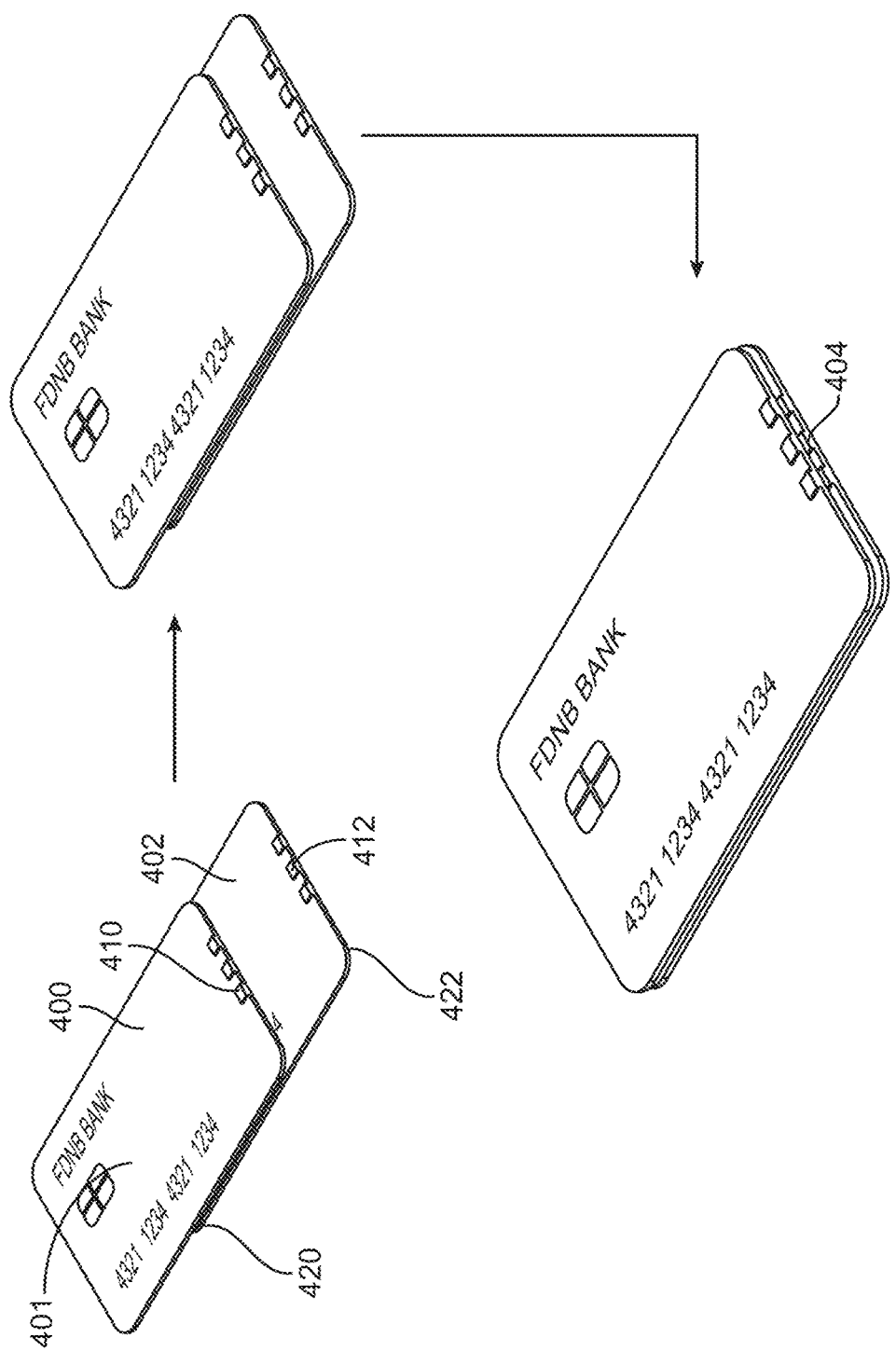
FIG. 4 illustrate a method and system for removably coupling multiple ICCs using a connection between output ports of a first ICC and input ports of a second ICC, according to various embodiments.
Figure 5:
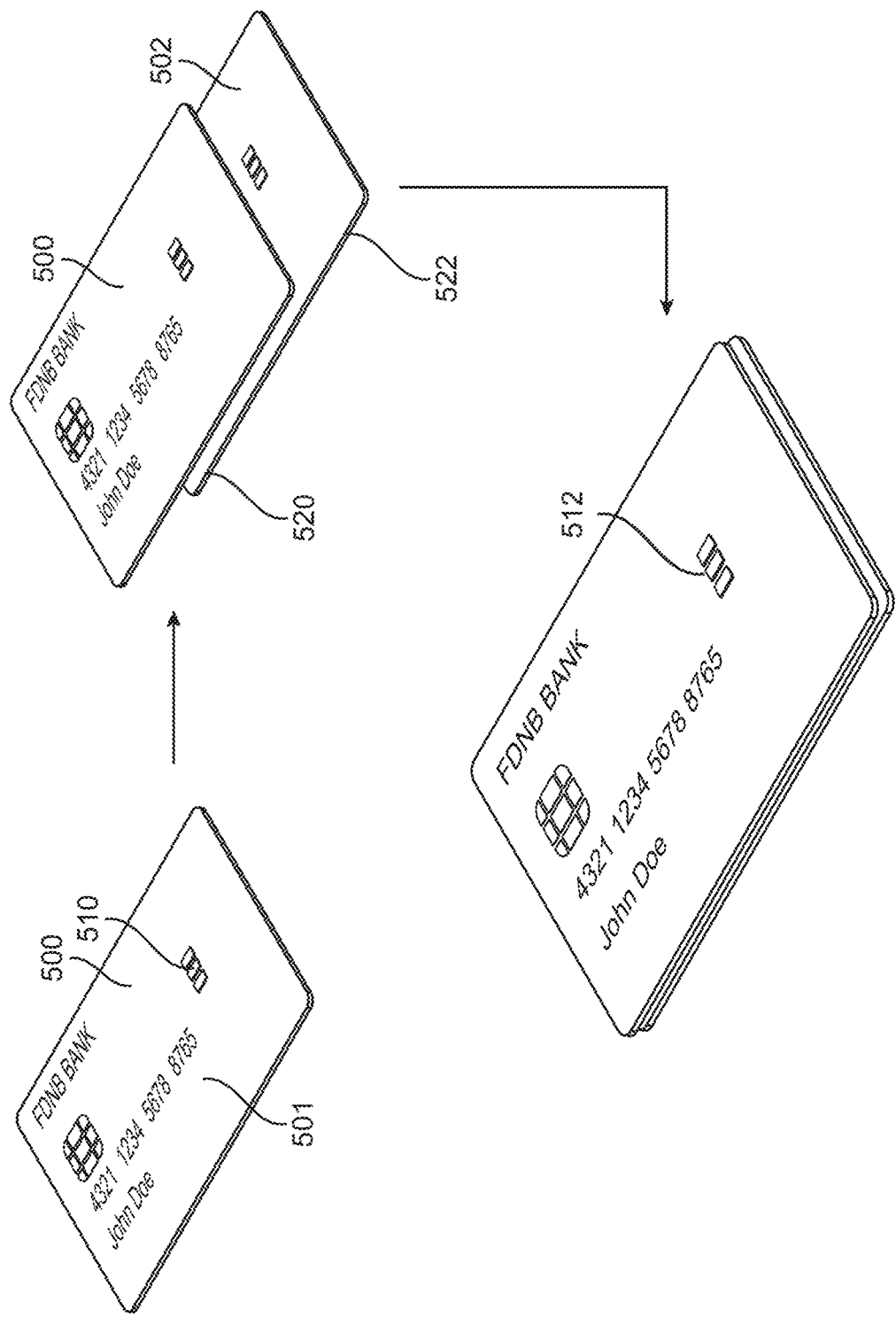
FIG. 5 illustrate another method and system removably coupling multiple ICCs using a connection between output ports of a first ICC and input ports of a second ICC, according to various embodiments.

FIGS. 4 and 5 illustrate how multiple ICCs may be removably coupled together. The difference between these figures is the placement of the input and output ports on the ICC. FIG. 4 illustrates the input ports 410 to be placed on an edge 422 of the ICC 400, with the output ports 404 being symmetrically provided on the opposite surface of the ICC 400. FIG. 5 illustrates the input ports 510 to be placed at a distance from the an edge of the ICC 500, with the output ports being symmetrically provided on the opposite surface of the ICC 500.

Referring back to FIG. 4, the first ICC 400 may be removably coupled to a second ICC 402. For example, the first ICC 400 may be positioned on top of the second ICC 402 at one edge 420, and slid over the second ICC 402 toward the opposite edge 422. One of ordinary skill in the art will appreciate that there are many ways to align the first ICC with the second ICC, and that the first ICC does not have to be slid over the second ICC to ensure alignment (and contact) of the output ports of the first ICC with the input ports of the second ICC. Once aligned, the output ports 404 of the first ICC 400 are in physical and electrical contact with the input ports 412 of the second ICC 402. While FIG. 4 illustrates coupling of two ICCs, coupling multiple ICCs in the shown manner is within the scope of embodiments. The first ICC may retrieve data from all of the additional ICCs coupled together.

As provided above, the ICCs illustrated in FIG. 5 are coupled together in a similar manner to FIG. 4. Referring now to FIG. 5, the first ICC 500 may be removably coupled to a second ICC 502 (among others). For example, the first ICC 500 may be positioned on top of the second ICC 502 at one edge 520, and slid over the second ICC 502 toward the opposite edge 522. One of ordinary skill in the art will appreciate that there are many ways to align the first ICC with the second ICC, and that the first ICC does not have to be slid over the second ICC to ensure alignment (and contact) of the output ports of the first ICC with the input ports of the second ICC. Once aligned, the output ports of the first ICC 500 (positioned opposite from the input ports 510 on the back surface of the first ICC 500) are in physical and electrical contact with the input ports 512 of the second ICC 502. While FIG. 5 illustrates coupling of two ICCs, coupling multiple ICCs in the shown manner is within the scope of embodiments. The first ICC may retrieve data from all of the additional ICCs coupled together.

Figure 6:
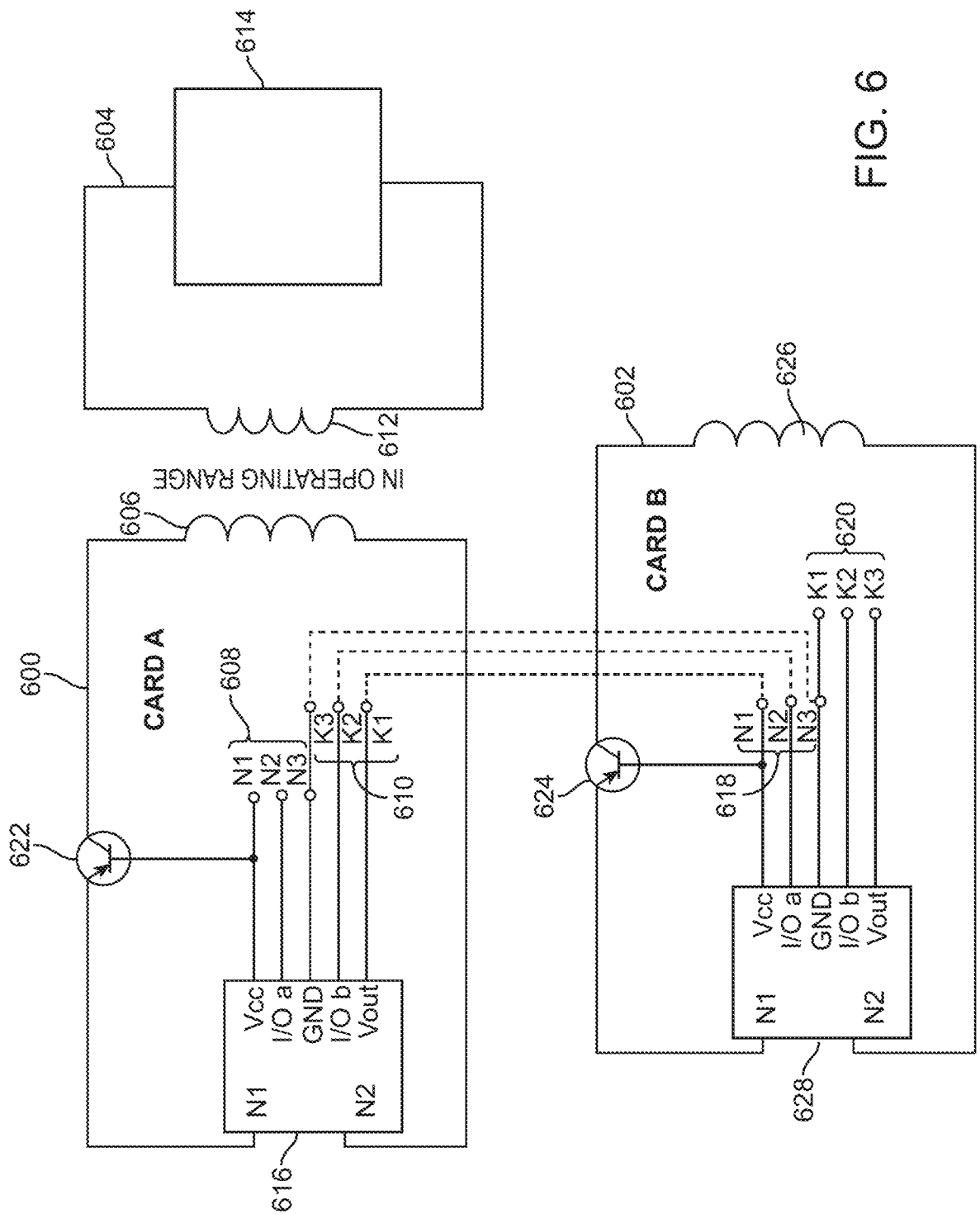
FIG. 6 illustrates the electrical connection between the two coupled ICCs that in an operating range of an access device, according to various embodiments.

FIG. 6 illustrates the electrical connection between the two coupled ICCs that in an operating range of an access device. As shown in FIG. 6, a first ICC 600 is coupled to a second ICC 602 as explained above in connection with, for example, FIGS. 4-5. Once coupled, the output ports K1, K2, K3 610 of the first ICC 600 are in physical and electrical contact with the input ports N1, N2, N3 618 of the second ICC 602.

FIG. 6 further illustrates an access device 604. The access device 604 may include an antenna 612 connected to an electronic circuit 614. The first ICC 600 includes an inductive antenna 606 and an integrated circuit 616 connected to the ends of the antenna 606. The inductive antenna 606 (e.g. an NFC antenna) is activated when the inductive antenna 606 comes in an operating range of the access device 604. The combination of the first ICC 600 and the access device 604 behaves like a transformer. When current passes through a primary coil (e.g. the access device antenna 612) and creates an electromagnetic field, which induces a current in the secondary coil (e.g. the first ICC's antenna 606). The first ICC 600 uses the current to power the first ICC's internal circuits (e.g. the integrated circuit 616). In the powered-on state, voltage is applied from the output port K1 of the first ICC 600 to the input port N1 of the second ICC 602. The current also flows to the Vcc pin of the second ICC 602, hence powering the integrated circuit 628 of the second ICC 602 and enabling data connectivity between the first ICC 600 and the second ICC 602.

The second ICC 602 further includes a transistor 624 (e.g. a positive-negative-positive (PNP) transistor) connected in series between the input port N1 of the second ICC 602 and the antenna 626. When current is applied to the base junction of the transistor 624 (e.g. when voltage is applied from the output port K1 of the first ICC 600 to the input port N1 of the second ICC 602), the circuit between the antenna 626 and the integrated circuit 628 of the second ICC 602 is disconnected, and the contactless communication (e.g. NFC) capability of the second ICC 602 is disabled. In this manner, only the first ICC 600 may communicate with the access device 604, while the second ICC 602 cannot communicate with the access device 604 while coupled to the first ICC 600. The data from the second ICC 602 can be read by the first ICC 600 using the I/O pins (e.g. general purpose input output (GPIO) pins) and transmitted to the access device 604 by the first ICC 600.

According to various embodiments, a system may include a first integrated circuit card and a second integrated circuit card, as shown for example in FIG. 6. The first integrated circuit card may include a first integrated circuit, a first antenna, a first set of input ports and a first set of output ports. The second integrated circuit card may include a second antenna, a second set of input ports and a second set of output ports. The second integrated circuit card may be removably coupled to the first second integrated circuit card such that the first set output ports are physically and electrically coupled to the second set of input ports. The second integrated circuit card receives a current from the first integrated circuit card when the first set output ports are physically and electrically coupled to the second set of input ports. The second antenna is deactivated when the second integrated circuit card receives the current from the first integrated circuit card. The first integrated circuit card is powered up when the first integrated circuit card is in an operating range of an access device. The second integrated circuit card further includes a transistor connected in series between one of the second set of input ports and the second antenna. When current is applied to a base junction of the transistor, a wireless communication capability of the second integrated circuit card is disabled.

According to various embodiments, a first integrated circuit card (e.g. ICC 600) may establish a wireless communication channel with an access device (E.g. access device 604). The first ICC may transmit a current to a second ICC (e.g. ICC 602) physically coupled to the first ICC such that an output port of the first ICC is coupled to an input port of the second ICC. The first ICC may retrieve data from the second ICC through the connection of the output-to-input ports. In some embodiments, the input port of the first ICC is provided on a first surface of the first ICC, and the output port of the second ICC is provided on a second surface of the second ICC opposite from the first surface. When the current is transmitted to the second ICC from the first ICC, a wireless communication capability of the second ICC is disabled. Therefore, the second ICC may not directly communicate with the access device.

The first ICC may incorporate the data received from the second ICC with data stored on the first ICC into a combined (e.g. aggregated) data record. According to various embodiments, one or more additional ICCs may be coupled to the first and second ICCs. The first ICC may retrieve additional data from the additional ICCs and incorporate the additional data into the combined data record. The first ICC may transmit the combined data record to the access device via the wireless communication channel. According to various embodiments, the first ICC may receive a first message from the access device and transmit a second message to the access device in response to the first message, wherein the second message indicates that the combined data record includes data from a plurality of integrated circuit cards (e.g. the second message includes a flag indicating that the data includes a combined data record from multiple ICCs).

In some embodiments, when the first ICC communicates (e.g. via NFC) with the access device to transmit the aggregated data gathered from additional ICCs, the first ICC also transmits a specific flag along with the aggregated data. For example, the specific flag may be included in the authorization request message. The flag may indicate a request to split the total transaction amount among the multiple accounts whose information is included in the aggregated data.

In the case of a payment transaction, the access device (e.g. a point-of-sale (POS)) receives the special flag to indicate that the transaction is a split transaction and that the access device would receive 2— N account data (e.g. cryptograms, tokens, account information, account credentials) for each of the cards coupled together. Once the access device receives all the data and the total transaction amount, the access device generates a special request to the transaction processing server computer (via an acquirer computer) indicating split transaction with N accounts in the authorization request message. The transaction processing server computer then creates multiple authorization request messages, and routes each authorization request message to a corresponding authorizing entity computer associated with the account (e.g. the issuer computer that generated the account).

FIG. 7 illustrates a block diagram and flowchart of steps that are performed in connection with splitting a transaction using multiple stacked integrated circuit cards. In order to split a total transaction amount of a transaction, two or more cards may be coupled together as explained, for example, in connection with FIGS. 4-5. A stack 702 formed of two or more coupled integrated circuit cards may be brought in operational proximity of an access device (e.g. POS) 704. As explained above, only one of the ICCs (e.g. a first ICC) may be in contactless communication with the access device 704. The first ICC may retrieve account information from the remaining ICCs in the stack 702, and combine the retrieved account information with the account information stored on the first ICC to generate an aggregated account data. At step 1, the first ICC may transmit the aggregated account data to the access device 704. From the access device 704 point of view, the stack 702 may behave as a single ICC. At step 2, the access device 704 may generate an authorization request message that includes the data (e.g. aggregated account data) received from the stack 702. The access device 704 may then forward the authorization request message to an acquirer computer 706. At step 3, the acquirer computer 706 may forward the authorization request message to a transaction processing server computer 708.

Transaction processing server computer 708 may analyze the content of the authorization request message and identify the aggregated account data. In some embodiments, the authorization request message may include an indicator such as a flag indicating the request to split the transaction among the accounts identified by the account information included in the aggregated account data. The transaction processing server computer 708 may then split the transaction according to a predetermined allocation scheme (e.g. may divide the total transaction amount equally among the accounts, or may divide the total transaction amount according to a predetermined percentage among the accounts). The transaction processing server computer 708 may then identify an authorizing entity (e.g. an issuer) associated with each one of the accounts identified by the account information included in the aggregated account data.

At step 4, transaction processing server computer 708 may generate an authorization request message for each account of the aggregated account data. The transaction processing server computer 708 may forward each authorization request message to the respective issuers. For example, as illustrated in FIG. 7, the stack 702 may include a first ICC and a second ICC. The transaction processing server computer 708 may identify that the first ICC is associated with a first issuer 710, and that the second ICC is associated with a second issuer 712. The transaction processing server computer 708 may divide the total transaction amount equally in two, and may generate a first authorization request message requesting authorization for first half of the total transaction amount and send it to the first issuer 710. Similarly, the transaction processing server computer 708 may generate a second authorization request message requesting authorization for second half of the total transaction amount and send it to the second issuer 712.

At step 5, the transaction processing server computer 708 may receive authorization response messages from respective issuers. Upon gathering a response from each issuer, the transaction processing server computer 708 may generate an authorization response message. According to various embodiments, the authorization response message may indicate whether the transaction has been authorized or declined. For example, the transaction may be declined if at least one of the issuer's does not authorize part of the transaction that is sent to that issuer for approval. That is, the transaction processing server computer 708 may return an authorization response message that authorizes the transaction only when all issuer's return authorized messages. The transaction processing server computer 708 may aggregate the individual authorization response messages from the issuers into a single authorization response message. At step 6, the transaction processing server computer 708 may send the authorization response message to the acquirer computer 706. At step 7, the acquirer computer 706 may return the authorization response message to the access device 704, or to the resource provider (e.g. merchant) computer associated with the access device 704.

Figure 8:
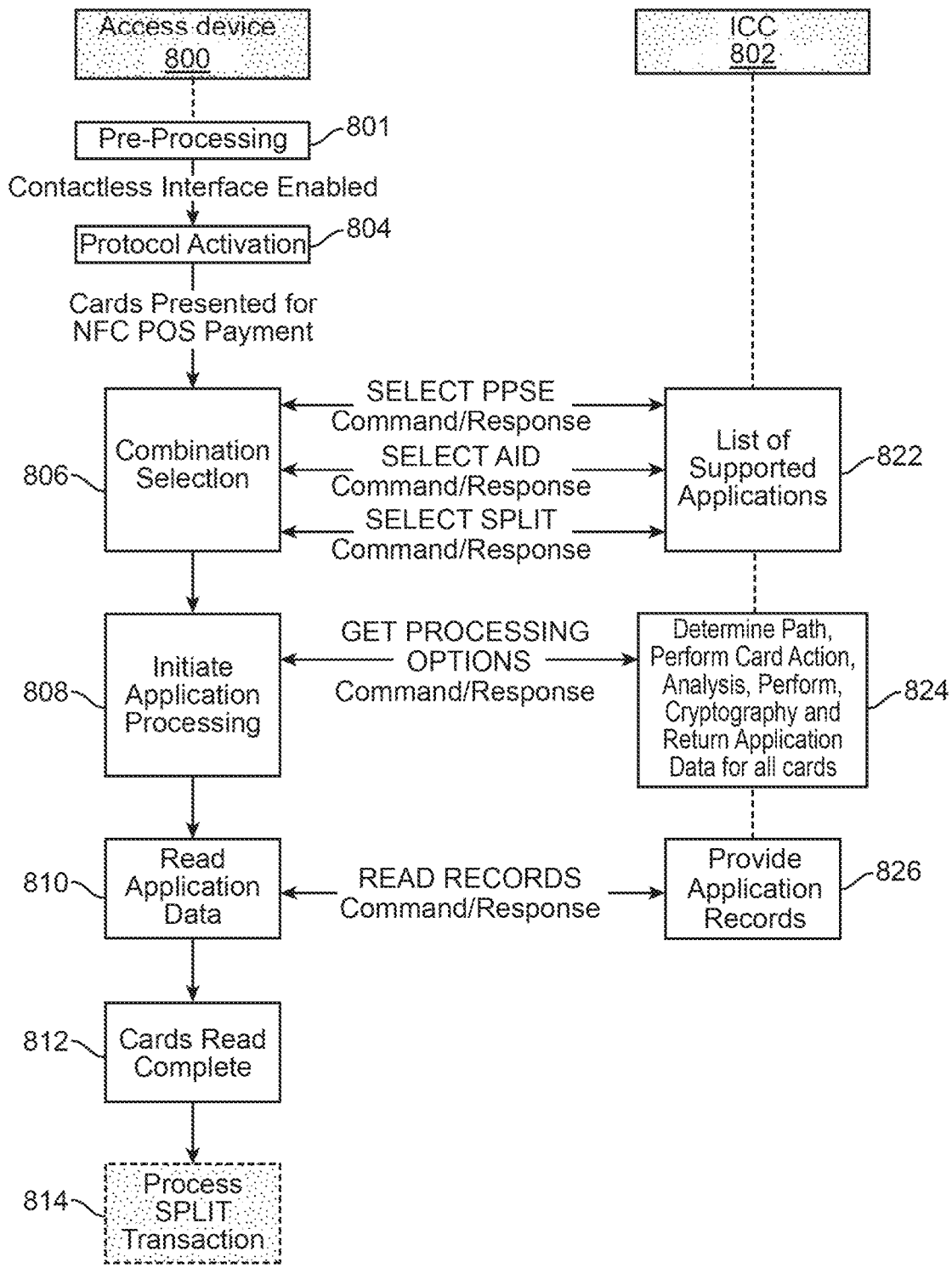
FIG. 8 illustrates another block diagram and flowchart of steps that are performed in connection with splitting a transaction using multiple stacked integrated circuit cards, according to various embodiments.

FIG. 8 illustrates another block diagram and flowchart of steps that are performed in connection with splitting a transaction using multiple stacked integrated circuit cards.

As illustrated in FIG. 8, according to various embodiments the access device may identify the request to split the transaction among multiple accounts upon receiving the aggregate account data from the stack of ICCs.

At step 801, the access device 800 may perform pre-processing before interacting with an ICC and enable a contactless interface in preparation for communication with the ICC via NFC. At step 804, the access device 800 may activate the NFC protocol start exchanging information using contactless, wireless NFC interface. The access device 800 may then determine the presence of the ICC 802 (which may include a stack of ICCs interacting with the access device 800 as a single ICC). For example, a user may present the ICC 802 to the access device 800 to initiate the payment for a total amount of a transaction.

During a combination selection process 806, the access device 800 may send a first command (e.g. Command SELECT Proximity Payment System Environment (PPSE)) to the ICC 802. The ICC 802 may respond with the file control information template (FCI) that includes a list of the supported payment applications 822 (e.g. Application Identifiers (AID)) combined with a priority indicator for every AID. The access device 800 may send a second command (e.g. Command SELECT AID) to the ICC 802. The ICC 802 responds if the application was selected successfully. The response also contains the File Control Information (FCI) template with application details, such as the Processing Options Data Object List (PDOL) with fields (e.g. Amount, Access device Country Code, Access device verification Results, Transaction Date/Type and the Unpredictable Number) needed by the access device 800 for the next step for all ICCs (e.g. a first ICC, and a second ICC) in the ICC stack. As part of the combination selection process 806, the access device 800 may send a third command (e.g. Command SELECT SPLIT) to the ICC 802. The ICC 802 responds with an acknowledgement command to indicate that the split mode processing is activated (e.g. the total transaction amount will be split among multiple accounts each represented by an ICC coupled to the ICC 802 in communication with the access device 800).

Following the application selection, the access device 800 requests processing options. At step 808, the access device 800 initiates the application processing and sends a command (e.g. Command GET PROCESSING OPTIONS) to the ICC 802. The access device 800 responds with the PDOL related data encoded according to the ICC 802 previous PDOL received in response to the second command. The ICC 802 responds with the Application Interchange Profile (AIP) and Application File Locator (AFL). The AFL is used by the access device 800 to read the data records from the ICC 802. The records may contain a variety of information, such as the Primary Account Number (PAN), the expiry date, among other information. The AFL also indicates whether any of the data will be provided for the Authentication Process. The ICC 802 remains in control of which files can be read by the access device 800.

At step 810, the access device 800 reads the application data by sending a command (e.g. Command READ RECORDS) to the ICC 802. The access device 800 requests the records according to the AFL and the ICC 802 responds to these requests with respective responses at step 826. Once the access device 800 completes reading data from the ICC 802 at step 812, the access device 800 processes the transaction (e.g. by generating and transmitting an authorization request message including the data retrieved from the ICC 802 to a transaction processing network through an acquirer computer). Upon receiving a response from the transaction processing server computer, the access device 800 may display a message indicating whether the transaction has been authorized or rejected.

According to embodiments, a first ICC may be removably coupled to one or more additional ICCs and may retrieve data from the additional ICCs. Once the first ICC gathers data (e.g. account information) from additional ICCs, the first ICC may then transmit the aggregated data to an access device via contactless communication. For example, in order to pay for a total amount of a transaction, the first ICC may gather the account information (e.g. an account number, an expiration date, a verification number (e.g. CVV)) from additional ICCs, and provide the aggregated account data to an access device processing the transaction. In some embodiments, the access device may read the aggregated account data from the first ICC.

Figure 9:
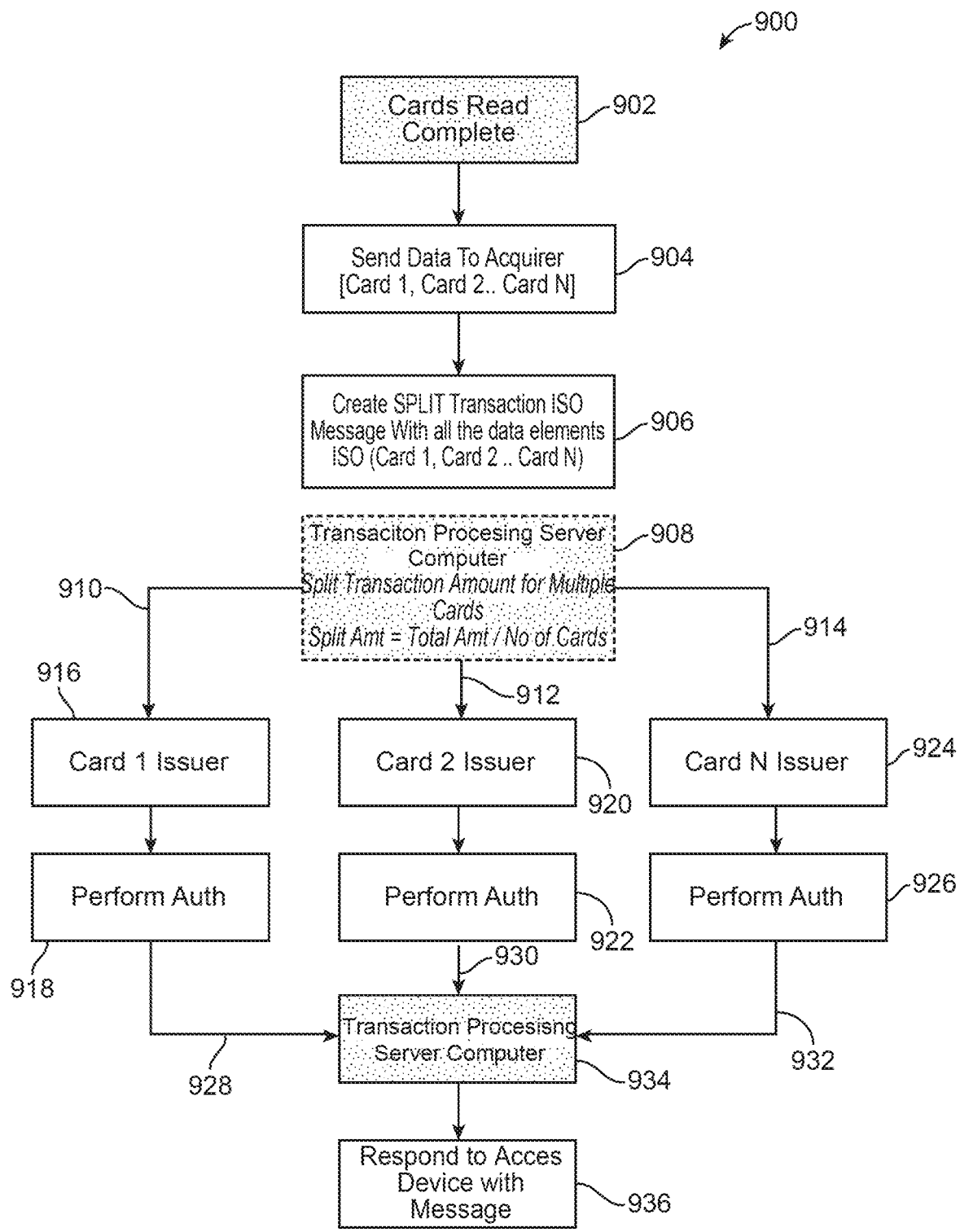
FIG. 9 illustrates a flowchart of steps performed to process a transaction using the aggregated account data received from a stack of ICCs, according to various embodiments.

FIG. 9 illustrates a flowchart of steps performed to process a transaction using the aggregated account data received from a stack of ICCs. At step 902, the access device completes reading data from the ICC (e.g. the aggregated account data from the first ICC coupled to one or more additional ICCs). At step 904, the access device may generate an authorization request message including the aggregated account data, and transmit the authorization request message to an acquirer computer. At step 906, the acquirer computer may identify the transaction as a split transaction based on the aggregated account data including account data for more than one account, and may generate a split transaction authorization request message including account data for all the accounts. At step 908, the transaction processing server computer may receive the split transaction authorization request message from the acquirer. In some embodiments, the transaction processing server computer may receive an authorization request message, and may identify that the message is for a split transaction without the acquirer computer having to identify the message as such.

At step 908, the transaction processing server computer may identify the aggregated account data and a total transaction amount in the authorization request message. The transaction processing server computer may identify multiple accounts in the aggregated account data, and may divide the total transaction amount among the multiple accounts according to a predetermined splitting scheme. For example, the predetermined splitting scheme may be to split the total transaction amount equally among the multiple accounts. According to another embodiment, the predetermined splitting scheme may assign preset percentages to each one of the multiple accounts based on, for example, the order the account information is provided in the authorization request message. The transaction processing server computer may determine the split amount to be charged to each account, and generate a split authorization request message for each account. The transaction processing server computer may also identify the issuers 916, 920, 924 associated with each account identified in the aggregated account data. At steps 910, 912 and 914, the transaction processing server computer transmits the split authorization request messages to associated issuers 916, 920, 924, respectively.

At steps 918, 922, 926, the respective issuers perform individual authorization processes for determining whether the split amounts is authorized or declined by each one of the issuers 916, 920, 924, respectively. At steps 928, 930, 932, each issuer 916, 920, 924 returns an authorization response message to the transaction processing server computer indicating an outcome of their respective authorization processes. At step 934, the transaction processing server computer may generate a final authorization response message based on the individual authorization response messages received from the issuers 916, 918, 920. In some embodiments, the final authorization response message may indicate that the transaction is authorized if only all issuers 916, 920, 924 returned an authorization approved message to the transaction processing server computer. In other embodiments, the transaction processing server computer may be programmed to return an authorized message even though one or more of the issuers 916, 920, 924 return an authorization declined message or fail to return a message in a predetermined amount of time. At step 936, the transaction processing server computer may transmit the final authorization response message to the access device.

Figure 10:
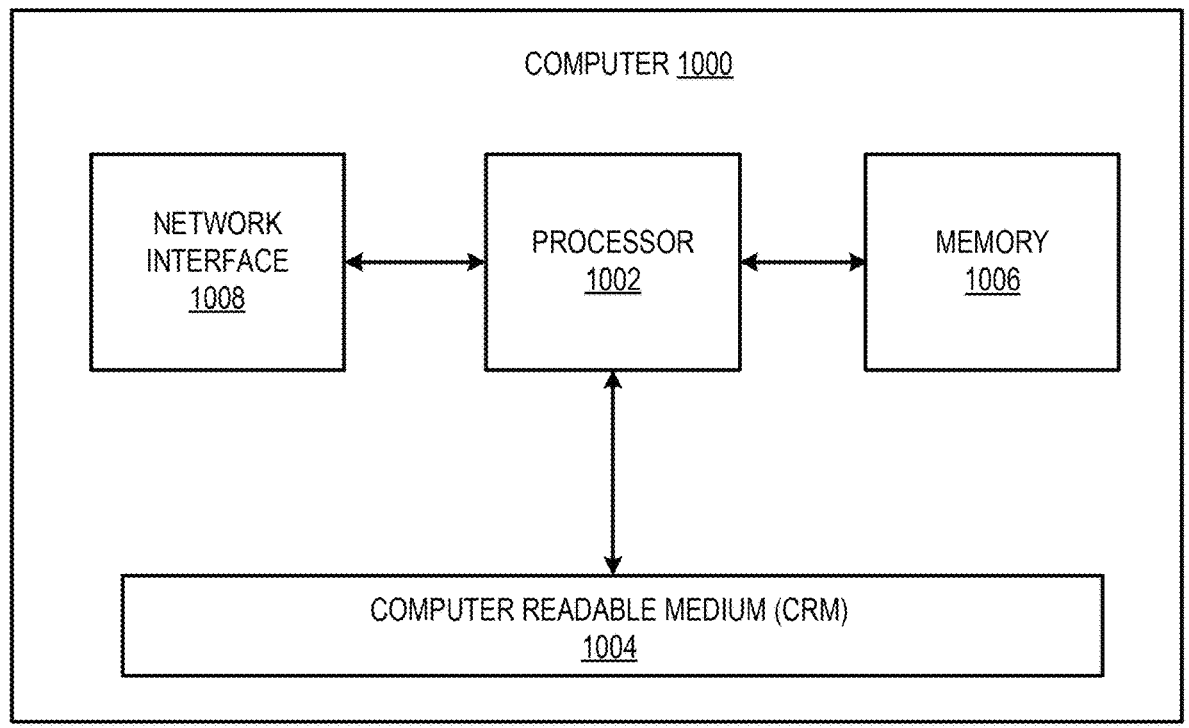
FIG. 10 illustrates a block diagram of an exemplary computer, according to various embodiments.

FIG. 10 shows a block diagram of a computer (e.g. a transaction processing server computer) according to various embodiments. The computer 1000 comprises a processor 1002 and a memory 1006. A network interface 1008 and a non-transitory computer readable medium 1004 may be coupled to the processor 1002.

The processor 1002 may be implemented as one or more integrated circuits (e.g., one or more single core or multicore microprocessors and/or microcontrollers). The processor 1002 can execute a variety of programs in response to program code or computer-readable code stored in a computer readable medium 1004. The processor 1002 may include functionality to maintain multiple concurrently executing programs or processes. The memory 1006 can store a plurality of applications executable by the processor 1002.

The network interface 1008 may be configured to connect to one or more communication networks to allow the computer 1000 to communicate with other entities (e.g. external computers). Some examples of the network interface 1008 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 1008 may include Wi-Fi™ Data transferred via the network interface 1008 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 1008 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Computer-readable medium 1004 may comprise one or more non-transitory media for storage and/or transmission. Suitable media include, as examples, a random access memory (RAM), a read only memory (ROM), a magnetic medium such as a hard-drive, or an optical medium such as a CD (compact disk) or DVD (digital versatile disk), flash memory, and the like. The computer-readable medium 1004 may be any combination of such storage or transmission devices. The computer readable medium 1004 may be embodied by any number of non-volatile memories (e.g., flash memory) and volatile memories (e.g., DRAM, SRAM), or any other non-transitory storage medium, or a combination of media.

According to various embodiments, the computer-readable medium 1004 may store instructions that, when executed by the processor 1002, cause the processor 1002 to receive an authorization request message from an acquirer computer for a transaction at a resource provider, wherein the authorization request message includes aggregated account data and an indicator indicating a request to split the transaction amount among multiple accounts identified by the aggregated data; determine a split transaction amount for each account according to a predetermined allocation scheme; determine an issuer associated with each one of the multiple account; generate multiple split transaction authorization request messages each in the amount of the split transaction amount determined for the associated account; transmit the split transaction authorization request messages to respective issuers; receive split transaction authorization response messages from respective issuers; generate an authorization response message based on the split transaction authorization response messages received from the issuers; and transmit the authorization response message to the acquirer computer (e.g. to the resource provider via the acquirer computer).

Embodiments provide for a number of technical advantages. For example, embodiments provide an integrated circuit card with exposed input and output ports that allow the ICC to be removably coupled to multiple ICCs. Once coupled, a first ICC among a stack of ICCs may read or retrieve data from remaining ICCs, and communicate with an access device to relay the retrieved data. The stack of ICCs may act as a single ICC when in communication with the access device. In case of requesting access to a physical location (e.g. to a building, a transit station or a transit vehicle), the stack of ICCs may be processed at the same time therefore providing access to multiple people without each having to present their ICCs to the access device. in the case of performing a transaction, the total transaction amount may be split among the accounts associated with the stack of ICCs. The single ICC communicating with the access device may relay information of multiple accounts associated with the ICCs, therefore triggering a split transaction processing. Embodiments eliminate the card holders to determine the split amount to be charged to each card, and eliminate the resource providers from processing multiple cards individually for the split amounts.

It should be understood that the embodiments as described above can be implemented in the form of control logic using computer software in a modular or integrated manner. Based on the disclosure and teachings provided herein, a person of ordinary skill in the art will know and appreciate other ways and/or methods to implement embodiments using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure.

What is claimed is:

1. A method comprising:
   establishing, by a first integrated circuit card, a wireless communication channel with an access device;
   transmitting, by the first integrated circuit card, a current to a second integrated circuit card physically coupled to the first integrated circuit card such that an output port of the first integrated circuit card is coupled to an input port of the second integrated circuit card, wherein when the current is transmitted to the second integrated circuit card from the first integrated circuit card, a wireless communication capability of the second integrated circuit card is disabled;
   retrieving, by the first integrated circuit card, data from the second integrated circuit card;
   incorporating, by the first integrated circuit card, the data received from the second integrated circuit card with data stored on the first integrated circuit card into a combined data record; and
   transmitting, by the first integrated circuit card, the combined data record to the access device via the wireless communication channel.

2. The method of claim 1, wherein the input port of the first integrated circuit card is provided on a first surface of the first integrated circuit card, and the output port of the second integrated circuit card is provided on a second surface of the second integrated circuit card opposite from the first surface.

3. The method of claim 1, further comprising:
   retrieving, by the first integrated circuit card, additional data from one or more integrated circuit cards in addition to the second integrated circuit card; and
   incorporating, by the first integrated circuit card, the additional data into the combined data record.

4. The method of claim 1, further comprising:
   receiving, by the first integrated circuit card, a first message from the access device; and
   transmitting, by the first integrated circuit card, a second message to the access device in response to the first message, wherein the second message indicates that the combined data record includes data from a plurality of integrated circuit cards.

5. An integrated circuit card comprising:
   a substrate;
   an integrated circuit embedded in the substrate;
   a plurality of input ports exposed on a first surface of the substrate, wherein the plurality of input ports are electrically coupled to the integrated circuit;
   a plurality of output ports exposed on a second surface of the substrate opposite from the first surface, wherein the plurality of output ports are electrically coupled to the integrated circuit, wherein one or more of the plurality of output ports are configured to be removably coupled to one or more input ports of a second integrated circuit card;
   an inductive antenna connected to one or more input pins of the integrated circuit; and
   a transistor connected in series between an input pin of the integrated circuit and the inductive antenna, wherein when current is applied to a base junction of the transistor via one of the plurality of input ports, a contactless communication capability of the integrated circuit card is disabled.

6. The integrated circuit card of claim 5, wherein the integrated circuit card establishes contactless communication with an access device via the inductive antenna.

7. The integrated circuit card of claim 5, wherein the integrated circuit card is powered up when the first integrated circuit card is in an operating range of an access device.

8. The integrated circuit card of claim 5, wherein one of the plurality of input ports and one of the plurality of output ports are connected to a same pin of the integrated circuit.

9. The integrated circuit card of claim 5, wherein the plurality of input ports are combined with the integrated circuit on the first surface of the substrate.

10. The integrated circuit card of claim 5, wherein the plurality of input ports are placed symmetric to the plurality of output ports with respect to the substrate.

11. The integrated circuit card of claim 5, further comprising:
    a first magnetic connector having a first polarity provided on a first surface of the substrate; and
    a second magnetic connector having a second polarity provided on a second surface of the substrate opposite from the first surface.

12. The integrated circuit card of claim 5, wherein the integrated circuit card retrieves data from the second integrated circuit card when the one or more of the plurality of output ports are electrically and physically coupled to the one or more of the plurality of input ports of the second integrated circuit card.

13. A system comprising:
    a first integrated circuit card including a first integrated circuit, a first antenna, a first set of input ports and a first set of output ports; and
    a second integrated circuit card including a second antenna, a second set of input ports and a second set of output ports;
    wherein the second integrated circuit card is removably coupled to the first integrated circuit card when the first set of output ports are physically and electrically coupled to the second set of input ports, and
    wherein the second antenna is deactivated when the second integrated circuit card receives current from the first integrated circuit card.

14. The system of claim 13, wherein the second integrated circuit card receives a current from the first integrated circuit card when the first set of output ports are physically and electrically coupled to the second set of input ports.

15. The system of claim 13, wherein the first integrated circuit card is powered up when the first integrated circuit card is in an operating range of an access device.

16. The system of claim 13, wherein the second integrated circuit card further includes a transistor connected in series between one of the second set of input ports and the second antenna, wherein when current is applied to a base junction of the transistor, a wireless communication capability of the second integrated circuit card is disabled.

* * * * *